United States Patent
Takemoto et al.

(10) Patent No.: US 9,453,670 B2
(45) Date of Patent: Sep. 27, 2016

(54) CONTROL APPARATUS AND METHOD FOR PARALLEL-TYPE CHILLER, AND COMPUTER-READABLE RECORDING MEDIUM IN WHICH PROGRAM FOR PARALLEL-TYPE CHILLER IS STORED

(71) Applicant: MITSUBISHI HEAVY INDUSTRIES, LTD., Tokyo (JP)

(72) Inventors: Akihiro Takemoto, Tokyo (JP); Kazuki Wajima, Tokyo (JP); Yasushi Hasegawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 260 days.

(21) Appl. No.: 14/017,734

(22) Filed: Sep. 4, 2013

(65) Prior Publication Data
US 2014/0069120 A1 Mar. 13, 2014

(30) Foreign Application Priority Data
Sep. 12, 2012 (JP) ................................. 2012-200539

(51) Int. Cl.
*F25D 3/12* (2006.01)
*F25B 7/00* (2006.01)
(Continued)

(52) U.S. Cl.
CPC .............. *F25B 49/02* (2013.01); *F25B 25/005* (2013.01); *F25B 2339/047* (2013.01);
(Continued)

(58) Field of Classification Search
CPC F25B 49/02; F25B 2339/04; F25B 2500/19; F25B 2700/195

USPC .................................................... 62/56, 208
See application file for complete search history.

(56) References Cited

U.S. PATENT DOCUMENTS 3,555,251 A * 1/1971 Shavit ...................... F24F 11/00
165/287
4,827,429 A * 5/1989 Silvestri, Jr. .......... F01D 17/085
60/660

(Continued)

FOREIGN PATENT DOCUMENTS

CN 1184240 A 6/1998
CN 100339663 C 9/2007
(Continued)

OTHER PUBLICATIONS

Office Action dated Jun. 2, 2015, issued in counterpart Chinese application No. 2013103972941 (w/English translation) (11 pages).
(Continued)

*Primary Examiner* — Henry Crenshaw
(74) *Attorney, Agent, or Firm* — Westerman, Hattori, Daniels & Adrian, LLP

(57) ABSTRACT

A control apparatus for a parallel-type chiller provided with multiple shell-and-tube-type heat exchangers and multiple compressors, the control apparatus having an estimation section which estimates a terminal temperature difference in an upstream-side space on the basis of a terminal temperature difference between a saturation temperature of a second fluid and a measured exit temperature value, the saturation temperature being estimated on the basis of a pressure value of the second fluid in a downstream-side space, the measured exit temperature value being a temperature of the first fluid measured at an exit of the heat exchanger, and estimates a temperature of the first fluid in the vicinity of an exit of the upstream-side space on the basis of the terminal temperature difference in the upstream-side space and the saturation temperature of the second fluid in the upstream-side space.

4 Claims, 3 Drawing Sheets

(51) Int. Cl.
    *F25B 39/04* (2006.01)
    *F25B 49/02* (2006.01)
    *F25B 25/00* (2006.01)
(52) U.S. Cl.
    CPC ... *F25B 2400/0411* (2013.01); *F25B 2400/06* (2013.01); *F25B 2500/19* (2013.01); *F25B 2600/021* (2013.01); *F25B 2600/2501* (2013.01); *F25B 2700/195* (2013.01); *Y02B 30/741* (2013.01)

(56) References Cited

U.S. PATENT DOCUMENTS

| | | | |
|---|---|---|---|
| 5,413,837 A | 5/1995 | Rock et al. | |
| 5,996,356 A * | 12/1999 | Kishimoto | F25B 1/00 165/140 |
| 6,185,946 B1 * | 2/2001 | Hartman | F04D 15/029 236/1 EA |
| 2004/0031286 A1 * | 2/2004 | Bodell, II | F04D 27/0253 62/515 |
| 2004/0144106 A1 * | 7/2004 | Douglas | F25B 49/02 62/127 |
| 2009/0242172 A1 * | 10/2009 | Fukushima | F25D 23/00 165/104.19 |
| 2010/0043460 A1 * | 2/2010 | Van de Vyver | F25B 5/02 62/78 |
| 2011/0016897 A1 * | 1/2011 | Akagi | F24D 3/18 62/161 |
| 2011/0209485 A1 * | 9/2011 | Lifson | F25B 49/02 62/115 |
| 2011/0219797 A1 * | 9/2011 | Taguchi | B60H 1/3208 62/129 |
| 2012/0111040 A1 * | 5/2012 | Kohler | F25B 1/00 62/115 |
| 2014/0069120 A1 * | 3/2014 | Takemoto | F25B 49/02 62/56 |
| 2014/0290288 A1 * | 10/2014 | Burns | F25B 49/02 62/115 |

FOREIGN PATENT DOCUMENTS

| | | |
|---|---|---|
| JP | 01-196460 A | 8/1989 |
| JP | 10-132400 A | 5/1998 |
| JP | 11-125476 A | 5/1999 |
| JP | 2005-180267 A | 7/2005 |
| JP | 2007-183077 A | 7/2007 |
| JP | 2010-275996 A | 12/2010 |
| JP | 2011-163736 A | 8/2011 |
| JP | 2011-169532 A | 9/2011 |
| JP | 2012-141098 A | 7/2012 |
| JP | 2012-532305 A | 12/2012 |
| WO | 2009/098751 A1 | 8/2009 |

OTHER PUBLICATIONS

Notification of Grant of Rights for Invention Patent dated Nov. 26, 2015, issued in counterpart Chinese Application No. 201310397294.1, with English translation (2 pages).

Office Action dated Jun. 21, 2016, issued in counterpart Japanese Patent Application No. 2012-0200539, with English translation. (9 pages).

* cited by examiner

CONTROL APPARATUS AND METHOD FOR PARALLEL-TYPE CHILLER, AND COMPUTER-READABLE RECORDING MEDIUM IN WHICH PROGRAM FOR PARALLEL-TYPE CHILLER IS STORED

CROSS-REFERENCE TO RELATED APPLICATIONS

This application is based on Japanese Patent Application No. 2012-200539, the contents of which are incorporated herein by reference.

TECHNICAL FIELD

The present invention relates to a control apparatus and method for a parallel-type chiller, and a computer-readable recording medium in which a program for a parallel-type chiller is stored.

BACKGROUND ART

For example, there has been used a technique for, in a parallel-type chiller in which two compressors are associated with one heat exchanger to constitute a chiller cycle, reducing the compression ratio of the compressors to improve efficiency by positioning an evaporator and a condenser in an one-pass countercurrent arrangement, partitioning a refrigeration system at a longitudinal-direction mid-position (middle) of each of the evaporator and the condenser to divide each of the evaporator and the condenser into a low-pressure side and a high-pressure side, and connecting the divided low-pressure sides and high-pressure sides to the compressors, respectively (for example, see Patent Literature 1). Since the parallel-type chiller provided with multiple compressors as described above can show a cooling capacity corresponding to the number of compressors, it is expected to perform individual control of the compressors, such as capacity control of each compressor and rotation speed control in the case where an inverter is used.

Patent Literature 2 proposes a technique for, when a cooling capacity changes, controlling an inverter operating compressors, by rotation speed determined on the basis of a first parameter reflecting refrigerant (gas) flow based on the quantity of output heat of a chiller and a second parameter reflecting a head based on evaporator pressure and condenser pressure to stably and efficiently operate a turbo chiller.

CITATION LIST

Patent Literature

{PTL 1}
Japanese Unexamined Patent Application, Publication No. Hei 10-132400
{PTL 2}
Japanese Unexamined Patent Application, Publication No. 2005-180267

SUMMARY OF INVENTION

Technical Problem

In the case of performing capacity control of compressors individually, it is necessary to calculate a load imposed on each compressor and the capability of each compressor. An amount of exchanged heat can be calculated by the product of the temperature difference and flow rate of cooling water (or chilled water) to be made to flow. However, in the case of partitioning a refrigerant system at a longitudinal-direction mid-position of an evaporator and a condenser as described above, it is not possible to adopt a method of directly measuring the temperature of cooling water (or the temperature of chilled water) by providing a thermometer at the mid-position.

Conventionally, since it is not possible to measure the temperature at a mid-position of a heat exchanger as described above, it is not possible to calculate a load imposed on each chiller, and it is not possible to perform compressor capacity control (for example, a suction vane, rotation speed of compressors and HGBP valves (hot-gas bypass valves)) and expansion valve control for each compressor. Therefore, even in the case of using multiple compressors, low-accuracy compressor capacity control is performed such as giving the same opening degree to all compressors as an expansion valve opening degree, and expansion valve control using the level of refrigerant as an indicator is performed in which control is performed so that a refrigerant level sensor attached in a heat exchanger shows a constant liquid level. Thus, there is a problem that a parallel-type chiller cannot be efficiently controlled.

The present invention has been made in view of the above situation, and its object is to provide a control apparatus and method for a parallel-type chiller, and a computer-readable recording medium in which a program for a parallel-type chiller is stored improving the efficiency of compressor capacity control.

Solution to Problem

In order to solve the above problems, the present invention adopts the following solutions.

A first aspect of the present invention is a control apparatus of a parallel-type chiller, the parallel-type chiller including multiple shell-and-tube-type heat exchangers each of which includes a tube through which first fluid flows, a shell in which second fluid flows outside the tube and a partition plate partitioning an internal space in a direction crossing a longitudinal direction of the tube; and multiple compressors, the control apparatus comprising: an estimation section which, when the partitioned internal spaces are an upstream-side space on an entrance side of the first fluid and a downstream-side space on an exit side of the first fluid, estimates a terminal temperature difference in the upstream-side space on the basis of a terminal temperature difference between a saturation temperature of the second fluid and a measured exit temperature value, the saturation temperature being estimated on the basis of a pressure value of the second fluid in the downstream-side space, the measured exit temperature value being a temperature of the first fluid measured at an exit of the heat exchanger, and estimates a temperature of the first fluid in the vicinity of an exit of the upstream-side space on the basis of the terminal temperature difference in the upstream-side space and the saturation temperature of the second fluid in the upstream-side space.

According to such a configuration, in the case where an internal space of a heat exchanger is partitioned into an upstream-side space on an entrance side of first fluid and a downstream-side space on an exit side of the first fluid, the first fluid is heat-exchanged with second fluid in the upstream-side space when being made to flow in from the entrance of the heat exchanger, heat-exchanged with the second fluid in the downstream-side space and discharged from the exit. At this time, a terminal temperature difference in the upstream-side space is estimated on the basis of a terminal temperature difference between a saturation temperature of the second fluid estimated on the basis of a pressure value of the second fluid in the downstream-side space and a measured exit temperature value, which is a temperature of the first fluid measured at the exit of the heat exchanger, and a temperature of the first fluid near an exit of the upstream side space is estimated on the basis of this terminal temperature difference in the upstream side space and the saturation temperature of the second fluid in the upstream side space.

Thereby, it is possible to simply and easily estimate the temperature of the first fluid between the upstream-side space and downstream-side space of the heat exchanger (that is, the mid-position of the heat exchanger). Furthermore, for example, even in the case where heat transfer performance degradation of the shell-and-tube-type heat exchanger occurs due to a stain of a tube part of the heat exchanger, it is possible to estimate the temperature at the mid-position of the heat exchanger taking into account influence of the stain.

As described above, by estimating the temperature at the mid-position of the heat exchanger, a load in each of the upstream-side space and the downstream-side space can be calculated, which leads to compressor capacity control, individual rotation control by an inverter and independent control of the suction vanes of compressors and the HGBP valves (hot-gas bypass valves), and thereby leading to performance improvement and certain avoidance of surging. Furthermore, the necessity of a level sensor for controlling an expansion valve is eliminated, which leads to cost reduction.

The estimation section of the control apparatus of a parallel-type chiller described above may correct the temperature of the first fluid in the vicinity of the exit of the upstream-side space according to loads on the upstream-side space and the downstream-side space.

If there is a capability ratio difference, the terminal temperature difference of the upstream-side space is different from the terminal temperature difference of the downstream-side space, and it is possible to estimate an intermediate temperature of the heat exchanger more accurately by performing the correction.

When the heat exchangers to which the control apparatus of a parallel-type chiller described above is applied are a condenser and an evaporator, the estimation section may subtract input power to the compressors from an amount of heat exchanged by the condenser to estimate an amount of heat exchanged by the evaporator.

Since the amount of heat exchanged by the condenser includes information about input power to the compressors, the cooling capacity of the evaporator can be accurately estimated by subtracting the information.

A second aspect of the present invention is a control method for a parallel-type chiller, the parallel-type chiller including multiple shell-and-tube-type heat exchangers each of which includes a tube through which first fluid flows, a shell in which second fluid flows outside the tube and a partition plate partitioning an internal space in a direction crossing a longitudinal direction of the tube; and multiple compressors, the control method comprising, when the partitioned internal spaces are an upstream-side space on an entrance side of the first fluid and a downstream-side space on an exit side of the first fluid, estimating a terminal temperature difference in the upstream-side space on the basis of a terminal temperature difference between a saturation temperature of the second fluid and a measured exit temperature value, the saturation temperature being estimated on the basis of a pressure value of the second fluid in the downstream-side space, the measured exit temperature value being a temperature of the first fluid measured at an exit of the heat exchanger, and estimating a temperature of the first fluid in the vicinity of an exit of the upstream-side space on the basis of the terminal temperature difference in the upstream-side space and the saturation temperature of the second fluid in the upstream-side space.

A third aspect of the present invention is a computer-readable recording medium in which a control program for a parallel-type chiller is stored, the parallel-type chiller including multiple shell-and-tube-type heat exchangers each of which includes a tube through which first fluid flows, a shell in which second fluid flows outside the tube and a partition plate partitioning an internal space in a direction crossing a longitudinal direction of the tube; and multiple compressors, the control program being for causing a computer to execute: an estimation process for, when the partitioned internal spaces are an upstream-side space on an entrance side of the first fluid and a downstream-side space on an exit side of the first fluid, estimating a terminal temperature difference in the upstream-side space on the basis of a terminal temperature difference between a saturation temperature of the second fluid and a measured exit temperature value, the saturation temperature being estimated on the basis of a pressure value of the second fluid in the downstream-side space, the measured exit temperature value being a temperature of the first fluid measured at an exit of the heat exchanger, and estimating a temperature of the first fluid in the vicinity of an exit of the upstream-side space on the basis of the terminal temperature difference in the upstream-side space and the saturation temperature of the second fluid in the upstream-side space.

Advantageous Effects of Invention

The present invention is advantageous in that the accuracy and efficiency of compressor capacity control can be improved.

DESCRIPTION OF EMBODIMENTS

An embodiment of a control apparatus, method and program for a parallel-type chiller according to the present invention will be described below with reference to drawings.

Figure 1:
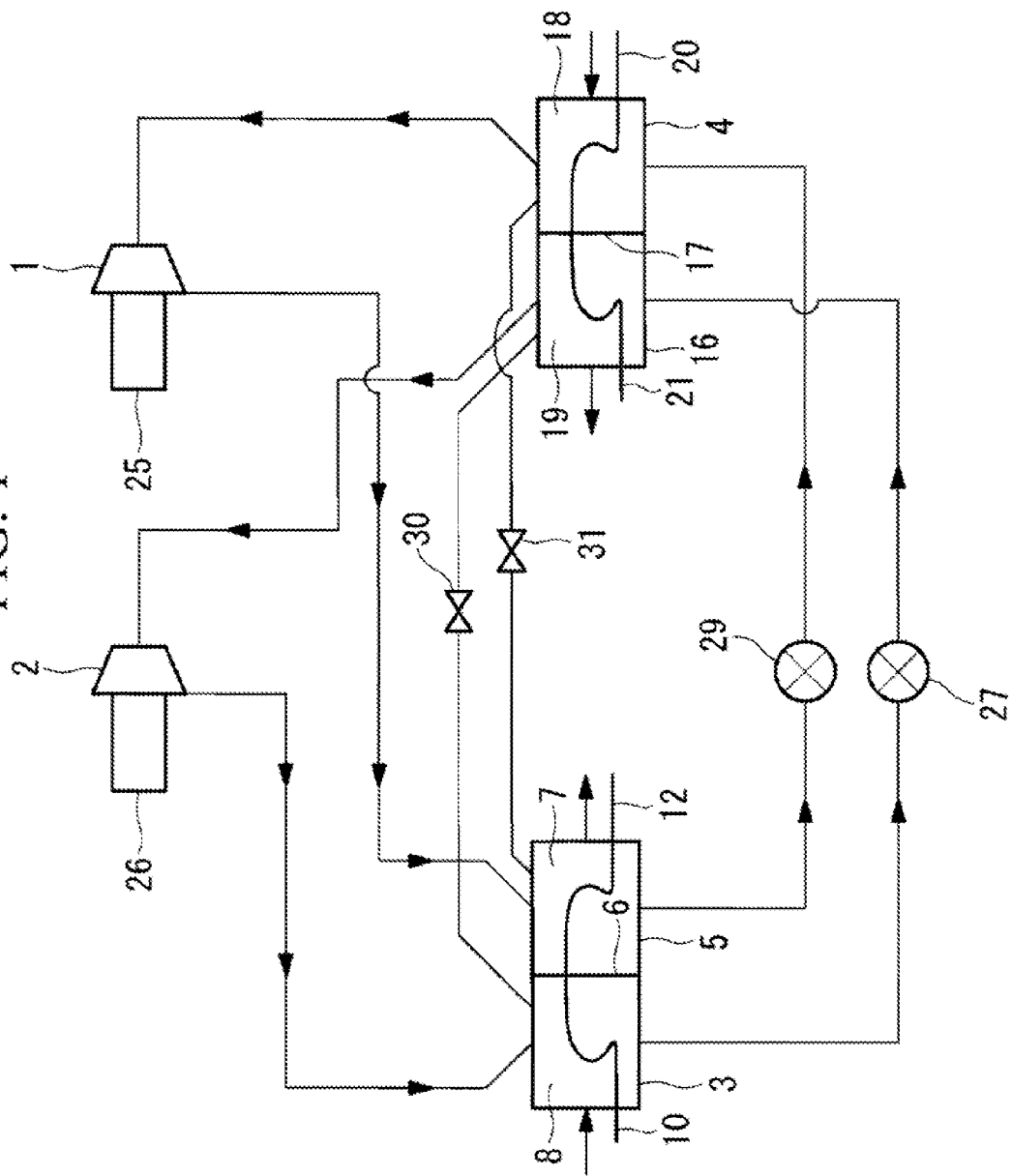
FIG. 1 is a diagram showing a schematic configuration of a refrigerant circuit of a chiller according to the present invention.

FIG. 1 shows a refrigerant circuit of a parallel-type chiller to which a control apparatus according to the present embodiment is applied. The parallel-type chiller is provided with: a shell-and-tube-type condenser 3 provided with tubes 10 and 12 through which cooling water (first fluid) flows, a shell 5 in which gas refrigerant (second fluid) flows outside the tubes 10 and 12 and a partition plate 6 which partitions an internal space in a direction crossing a longitudinal direction of the tubes; and a shell-and-tube-type evaporator 4 provided with tubes 20 and 21 through which chilled water (the first fluid) flows, a shell 16 in which gas refrigerant (the second fluid) flows outside the tubes 20 and 21 and a partition plate 17 which partitions an internal space in a direction crossing a longitudinal direction of the tubes 20 and 21; multiple compressors 1 and 2; throttle mechanisms 27 and 29; and HGBP valves (hot-gas bypass valves) 30 and 31. The refrigerant circuit of the parallel-type chiller according to the present embodiment is assumed to have a one-pass structure in which cooling water or chilled water flows from one end side of a tube to the other end side.

The condenser 3 is provided with a downstream-side space 7 and an upstream-side space 8 formed by partitioning the inside of the shell 5 with the partition plate 6. Cooling water is made to flow in from the tube 10 arranged in the upstream-side space 8 at a predetermined temperature (for example, 32° C.), flows through the tube 10 and the tube 12 arranged in the downstream-side space 7 in this order and is made to flow out at a predetermined temperature (for example, 40° C.)

Similarly, the evaporator 4 is provided with an upstream-side space 18 and a downstream-side space 19 formed by partitioning the inside of the shell 16 with the partition plate 17. A cooled medium (the first fluid) such as chilled water and brine is made to flow in from the tube 20 arranged in the upstream-side space 18 at a predetermined temperature (for example, 12° C.), flows through the tube 20 and the tube 21 arranged in the downstream-side space 19 in this order and is made to flow out at a predetermined temperature (for example, 40° C.)

Figure 2:
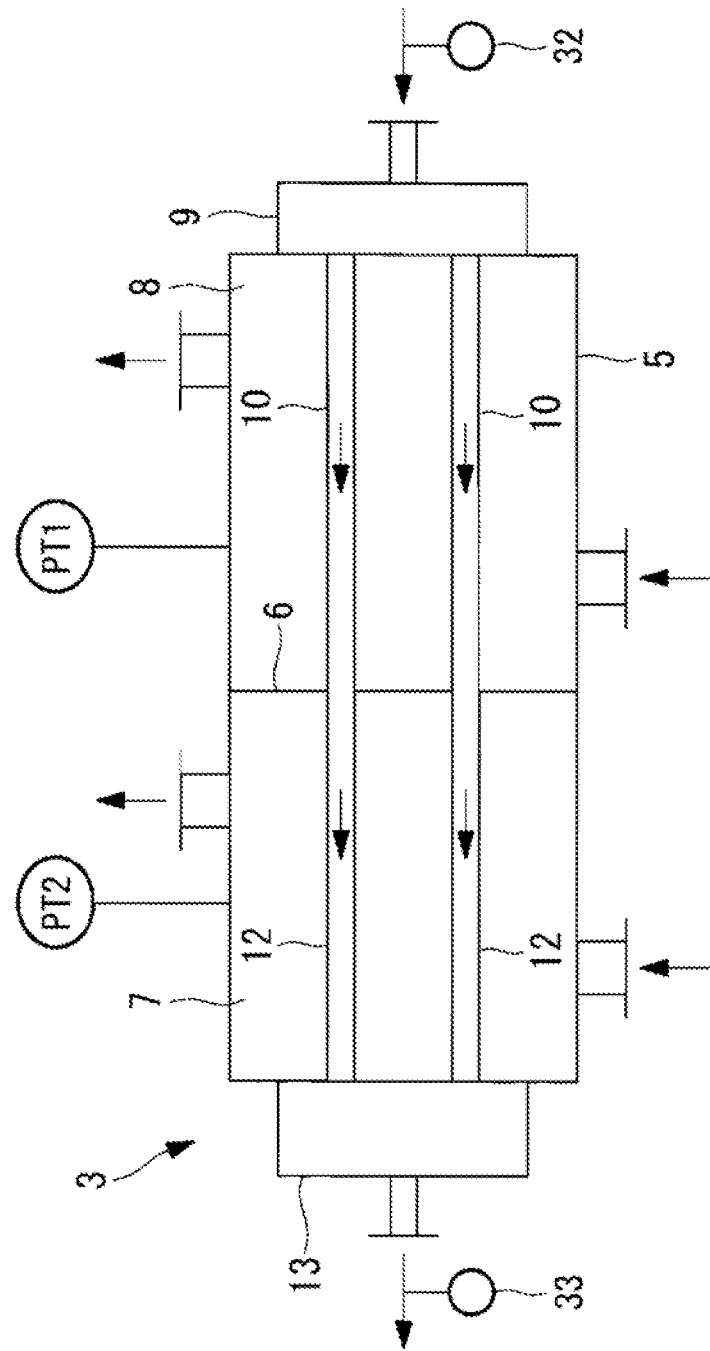
FIG. 2 is a diagram showing the details of a condenser according to the present invention.

FIG. 2 shows the details of the condenser 3. As shown in FIG. 2, in the case where the shell 5 is partitioned with the partition plate 6 crossing the tubes 10 and 12 at a mid-position between the tubes 10 and 12, the cooling water flows through the tube 10 arranged in the upstream-side space 8 from an entrance chamber 9, flows through the tube 12 arranged in the downstream-side space 7, and is made to flow out from an exit chamber 13. The condenser 3 is provided with a first pressure measuring section PT1 which measures a pressure of gas refrigerant in the upstream-side space and a second pressure measuring section PT2 which measures a pressure of the gas refrigerant in the downstream-side space, and information about each of the pressure values measured by them is outputted to a control apparatus 50 (see FIG. 3). The condenser 3 is provided with a first temperature measuring section 32 which measures the temperature of the cooling water made to flow in from the entrance chamber 9 of the condenser 3, and a second temperature measuring section 33 which measures the temperature of the cooling water made to flow out from the exit chamber 13 of the condenser 3. Information about a measured entrance temperature value which has been measured at the entrance and a measured exit temperature value which has been measured at the exit is outputted to the control apparatus 50. The evaporator 4 is also configured similarly to the condenser 3.

In the case of a heavy refrigeration load, the compressors 1 and 2 are driven by motors 25 and 26. Then, gas refrigerant discharged from the compressor 1 enters the downstream-side space 7 of the condenser 3 and is heat-radiated by the cooling water flowing in the tube 12, and then condensed and liquefied. By the liquefied refrigerant (liquid refrigerant) being throttled by the throttle mechanism 29, the flow rate thereof is adjusted, and the liquid refrigerant is adiabatically expanded and enters the upstream-side space 18 of the evaporator 4. Then, by cooling the chilled water (cooled medium) flowing in the tube 20, the liquid refrigerant is evaporated and gasified, and then sucked into the compressor 1.

On the other hand, gas refrigerant discharged from the compressor 2 enters the upstream-side space 8 of the condenser 3 and is heat-radiated by the cooling water flowing in the tube 10, and then condensed and liquefied. By this liquid refrigerant being throttled by the throttle mechanism 27, the flow rate thereof is adjusted, and the liquid refrigerant is adiabatically expanded and enters the downstream-side space 19 of the evaporator 4. Then, by cooling the chilled water (cooled medium) flowing in the tube 21, the liquid refrigerant is evaporated and gasified, and then sucked into the compressor 2.

Figure 3:
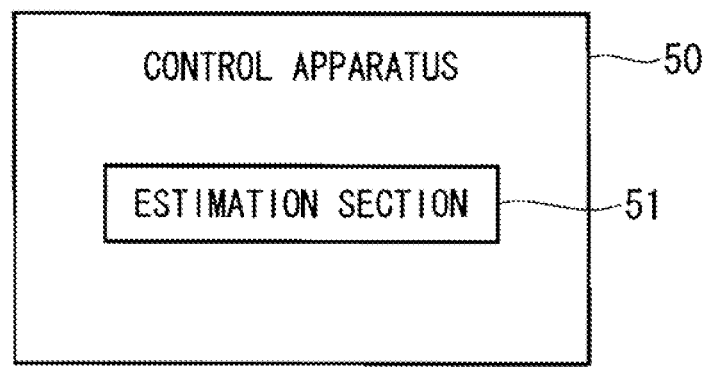
FIG. 3 is a functional block diagram of a control apparatus according to the present invention.

The control apparatus 50 which is applied to the parallel-type chiller having the refrigerant circuit described above will be described. As shown in FIG. 3, the control apparatus 50 is provided with an estimation section 51.

The estimation section 51 estimates a terminal temperature difference in the upstream-side space on the basis of a terminal temperature difference between the saturation temperature of the second fluid estimated on the basis of the pressure value of the second fluid in the downstream-side space and a measured exit temperature value, which is a temperature of the first fluid measured at an exit of a heat exchanger, and estimates a temperature of the first fluid near the exit of the upstream-side space on the basis of the terminal temperature difference in the upstream-side space and the saturation temperature of the second fluid in the upstream-side space.

A specific estimation method will be described below with a case where a heat exchanger is the condenser 3 given as an example. Assuming that the terminal temperature difference on the downstream side of the condenser 3 and the terminal temperature difference on the upstream side of the condenser 3 are equal to each other, the estimation section 51 assumes the temperature of the cooling water at the mid-position of the condenser 3 on the basis of the following equation (1) (Tcwmid' denotes the temperature of the cooling water at the mid-position (an assumed value) (° C.)). Here, a cooling water entrance temperature (a measured entrance temperature value) (° C.), which is the temperature of the cooling water on the entrance side of the condenser 3 measured by the first temperature measuring section 32, is denoted by Tcwin; a cooling water exit temperature (a measured exit temperature value) (° C.), which is the temperature of the cooling water on the exit side of the condenser 3 measured by the second temperature measuring section 33, is denoted by Tcwout; a saturation temperature (° C.) corresponding to the gas refrigerant condensation pressure of the upstream-side space 8 estimated on the basis of the first pressure measuring section PT1 is denoted by TTc1; and a saturation temperature (° C.) corresponding to the gas refrigerant condensation pressure of the downstream-side space 7 estimated on the basis of the second pressure measuring section PT2 is denoted by TTc2.

$$Tcwmid' = TTc1 - (TTc2 - Tcwout) \tag{1}$$

Furthermore, the estimation section 51 corrects the temperature of the cooling water or chilled water (the first fluid) near the exit of the upstream-side space according to loads imposed on the upstream-side space and the downstream-side space. More specifically, the estimation section 51 calculates a cooling capacity ratio a' of the upstream-side space 8 by the following equation (2), and a cooling capacity ratio b' of the downstream-side space 7 by the following equation (3).

$$a'=(Tcwmid'-Tcwin)/(Tcwout-Tcwin) \quad (2)$$

$$b'=(Tcwout-Tcwmid')/(Tcwout-Tcwin) \quad (3)$$

If the capability ratio between the upstream side and downstream side of the condenser 3 is 50:50, on the basis of the equations (2) and (3), then the terminal temperature differences of the upstream side and the downstream side are the same. On the other hand, if the capability ratio between the upstream side and downstream side of the condenser 3 is imbalanced, the terminal temperature differences are different from each other. Therefore, in the present embodiment, appropriate correction is performed in consideration of the case where there is such capability ratio imbalance (see equations (4) and (5) below). Here, Tcwmid denotes the temperature (° C.) of the cooling water at the mid-position of the condenser 3 after correction; c denotes a corrected value (° C.) due to a capability ratio difference; and a planned value of the cooling water temperature difference between the exit and entrance of the condenser 3 is assumed to be 6.44.

$$Tcwmid=Tcwmid'+c \quad (4)$$

$$c=(b'-0.5)\times 3\times(Tcwout-Tcwin)/6.44 \quad (5)$$

Coefficients in the above equation (5) (for example, "3") are parameters depending on the specifications and performance of the chiller, and coefficients are not limited thereto.

When the cooling capacity ratio on the upstream side of the condenser 3 after correction is denoted by a, and the cooling capacity ratio on the downstream side of the condenser 3 after correction is denoted by b, the cooling capacity ratios of the upstream side and the downstream side are corrected as shown by the following equations (6) and (7).

$$a=(Tcwmid-Tcwin)/(Tcwout-Tcwin) \quad (6)$$

$$b=(Tcwout-Tcwmid)/(Tcwout-Tcwin) \quad (7)$$

Figure 4:
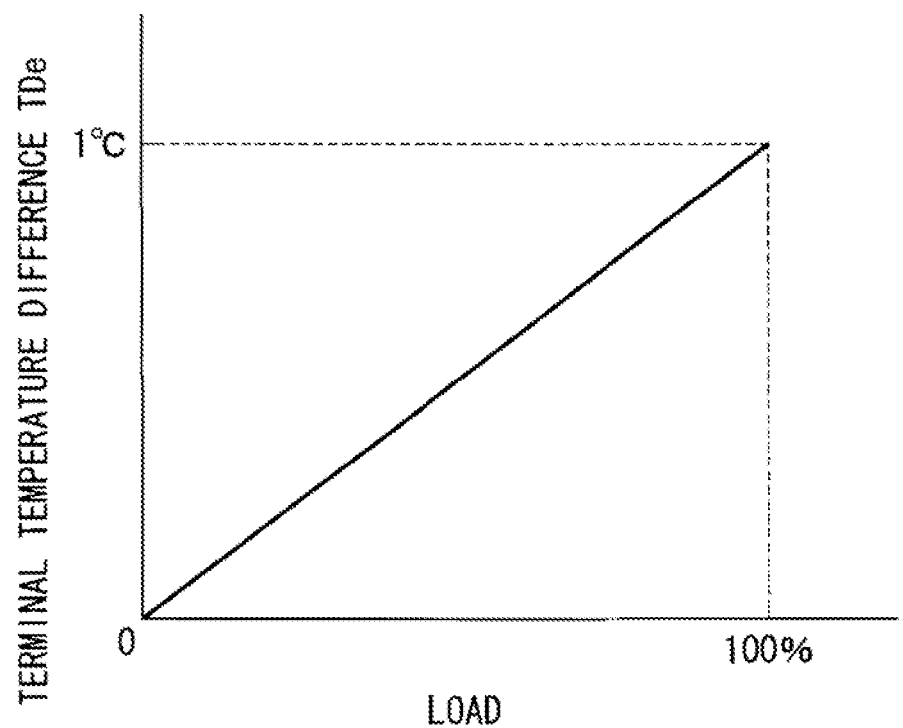
FIG. 4 is a diagram showing a relationship between load and temperature difference.

In FIG. 4, a diagram showing a relationship between terminal temperature difference and load is given as an example. In FIG. 4, a horizontal axis indicates load (%), and a vertical axis indicates terminal temperature difference TDe (° C.).

As shown in FIG. 4, the terminal temperature difference is in proportion to the load, and in the example, the terminal temperature difference is about 1° C. when the load is 100%.

Furthermore, it is desirable that the estimation section 51 remove input power to the compressors 1 and 2 from the amount of heat exchanged by the condenser 3 to estimate the amount of heat exchanged by the evaporator 4.

More specifically, the amount of heat exchanged by the evaporator 4 is accurately calculated by removing motor exhaust heat by a method such as (1) calculating the amount of heat exchanged by the evaporator 4 on the basis of heat balance, by a motor input estimated from measured values of inputs of the motors 25 and 26 connected to the compressors 1 and 2 or current values inputted from an inverter connected to the motors 25 and 26, and (2) calculating a ratio of amount of heat exchanged by the evaporator 4 from a ratio of amounts of heat exchanged by the condenser 3 on the upstream side and the downstream side and calculating an intermediate temperature of the chilled water flowing through the evaporator 4.

Description will be made below on the operation of the control apparatus 50 according to the present embodiment in the case where the heat exchanger is the condenser 3 and in the case where the heat exchanger is the evaporator 4.

In the case where the heat exchanger is the condenser 3, the saturation temperature of the gas refrigerant is estimated (for example, 41° C.) by the estimation section 51 on the basis of the pressure value of the gas refrigerant in the downstream-side space 7 measured by the second pressure measuring section PT2 of the condenser 3, and the terminal temperature difference in the upstream-side space 8 is estimated on the basis of a terminal temperature difference between the measured exit temperature value (for example, 40° C.), which is the temperature of the cooling water measured by the second temperature measuring section 33 at the exit of the condenser 3, and the estimated saturation temperature described above (for example, 41° C.–40° C.=1° C.). On the basis of the saturation temperature (for example, 37° C.) of the gas refrigerant estimated on the basis of the pressure value of the gas refrigerant in the upstream-side space 8 measured by the first pressure measuring section PT1 in the upstream-side space 8, and the estimated terminal temperature difference in the upstream-side space 8 described above (for example, 1° C.), the temperature of the cooling water near the exit of the upstream-side space (that is, the mid-position of the condenser 3) is estimated (for example, 37° C.–1° C.=36° C.)

In the case where the heat exchanger is the evaporator 4, the saturation temperature of the gas refrigerant is estimated (for example, 5° C.) by the estimation section 51 on the basis of the pressure value of the gas refrigerant in the downstream-side space 19 measured by the second pressure measuring section of the evaporator 4, and the terminal temperature difference in the upstream-side space 18 is estimated on the basis of a terminal temperature difference between the measured exit temperature value (for example 6° C.), which is the temperature of the chilled water measured by the second temperature measuring section at the exit of the evaporator 4 and the estimated saturation temperature described above (for example, 6° C.–5° C.=1° C.). On the basis of the saturation temperature (for example, 8° C.) of the gas refrigerant estimated on the basis of the pressure value of the gas refrigerant in the upstream-side space 18 measured by the first pressure measuring section in the upstream-side space 18, and the estimated terminal temperature difference in the upstream-side space 18 described above (for example, 1° C.), the temperature of the chilled water near the exit of the upstream-side space (that is, the mid-position of the evaporator 4) is estimated (for example, 8° C.–1° C.=9° C.)

On the basis of the temperature of the first fluid at the mid-position of the heat exchanger estimated in this way, the control apparatus 50 performs capacity control of the compressors 1 and 2, individual rotation control of the compressors by an inverter and independent control between the suction vanes of the compressors 1 and 2 and the HGBP valves (hot-gas bypass valves) 30 and 31.

The control apparatus 50 according to the embodiment described above may be configured such that all or a part of the process described above is separately performed with the use of software in. In this case, the control apparatus 50 is provided with a CPU, a main memory such as a RAM, and a computer-readable recording medium in which a program (for example, a control program) for realizing all or a part of the above process is recorded. Then, by the CPU reading the program recorded in the storage medium and executing processing of information and arithmetic processing, processes similar to those of the control apparatus 50 described above is realized.

Here, the computer-readable recording medium refers to a magnetic disk, a magneto-optical disk, a CD-ROM, a DVD-ROM, a semiconductor memory and the like. The computer program may be distributed to a computer via a communication line so that the computer that has received the distribution may execute the program.

As described above, according to the control apparatus 50, method and program for a parallel-type chiller according to the present embodiment, when cooling water (or chilled water) is made to flow in from the tube 10 (or 20) of the condenser 3 (or the evaporator 4) in the case where the internal space of the condenser 3 (or the evaporator 4) is partitioned into an upstream-side space on the cooling water (or chilled water) entrance side and a downstream-side space on the cooling water (or chilled water) exit side, the cooling water (or chilled water) is heat-exchanged with gas refrigerant flowing in the upstream-side space, heat-exchanged with the gas refrigerant in the downstream-side space 7 (or 19) and discharged from the tube 12 (or 21). At this time, the terminal temperature difference in the upstream-side space is estimated on the basis of terminal temperature difference between the saturation temperature of the gas refrigerant estimated on the basis of the pressure value of the gas refrigerant in the downstream-side space and a measured exit temperature value, which is the temperature of the cooling water (or chilled water) measured at the exit of the condenser 3 (or the evaporator 4), and then, the temperature of the cooling water (or chilled water) near the exit of the upstream-side space is estimated on the basis of the terminal temperature difference of the upstream-side space and the saturation temperature of the gas refrigerant in the upstream-side space.

Thereby, it is possible to simply and easily estimate the temperature of the cooling water (or chilled water) at the mid-position between the upstream-side space and the downstream-side space of the condenser 3 (or the evaporator 4). Furthermore, since the temperature at the mid-position is estimated on the basis of a designed value of terminal temperature difference and an actual measurement of terminal temperature difference on the downstream side, it is possible to, even in the case where heat transfer performance degradation of a shell-and-tube-type heat exchanger occurs due to a stain of a tube part of the heat exchanger, estimate the temperature at the mid-position taking into account influence of the stain.

By estimating a temperature on the basis of a refrigerant pressure measured in each of the upstream-side space and the downstream-side space, it is possible to measure a more accurate temperature in comparison with the case of providing a temperature sensor in each space to measure temperature.

As described above, by estimating a temperature at a mid-position of a heat exchanger, a load in each of the upstream-side space and the downstream-side space can be calculated, which leads to compressor capacity control, individual rotation control by an inverter and independent control between the suction vanes of compressors and the HGBP valves (hot-gas bypass valves) 30 and 31, and thereby, leading to performance improvement and certain avoidance of surging. Furthermore, the necessity of a level sensor for controlling an expansion valve is eliminated, which leads to cost reduction.

When the condenser 3 and the evaporator 4 are compared, higher accuracy can be obtained by the condenser 3. The reason is that, though a heat transfer pipe (tube) is never soaked with liquid in the case of the condenser 3, the heat transfer pipe is sometimes soaked with liquid and sometimes not, depending on whether the load is heavy or not and, therefore, the heat exchange state changes in the case of the evaporator 4. The relationship between terminal temperature difference and load changes in the case of the evaporator 4. Thus, a higher accuracy can be obtained by the condenser 3 in comparison with the evaporator 4.

REFERENCE SIGNS LIST

1, 2 compressor
3 condenser
4 evaporator
5 shell
6 partition plate
7 downstream-side space of condenser
8 upstream-side space of condenser
10, 12 tube
16 shell
17 partition plate
27, 29 throttle mechanism
18 upstream-side space of evaporator
19 downstream-side space of evaporator
20, 21 tube
50 control apparatus
51 estimation section

The invention claimed is:

1. A control apparatus of a parallel-type chiller, the parallel-type chiller including multiple shell-and-tube-type heat exchangers each of which includes a tube through which first fluid flows, a shell in which second fluid flows outside the tube and a partition plate partitioning an internal space in a direction crossing a longitudinal direction of the tube; and multiple compressors, the control apparatus comprising:

an estimation section which, when the partitioned internal spaces are an upstream-side space on an entrance side of the first fluid and a downstream-side space on an exit side of the first fluid, calculates a terminal temperature difference in the downstream-side space from a saturation temperature of the second fluid and a measured exit temperature value, the saturation temperature being estimated on the basis of a pressure value of the second fluid in the downstream-side space, the measured exit temperature value being a temperature of the first fluid measured at an exit of the heat exchanger, and estimates a temperature of the first fluid in the vicinity of an exit of the upstream-side space as a estimated by subtracting the terminal temperature difference from a saturation temperature of the second fluid which is estimated on the basis of a pressure value of the second fluid in the upstream-side space, wherein the estimation section corrects the estimated temperature according to loads on the upstream-side space and the downstream-side space.

2. The control apparatus of a parallel-type chiller according to claim 1, wherein, when the heat exchangers are a condenser and an evaporator, the estimation section subtracts an amount of heat corresponding to input power to the compressors from an amount of heat exchanged by the condenser to estimate an amount of heat exchanged by the evaporator.

3. A control method for a parallel-type chiller, the parallel-type chiller including multiple shell-and-tube-type heat exchangers each of which includes a tube through which first fluid flows, a shell in which second fluid flows outside the tube and a partition plate partitioning an internal space in a direction crossing a longitudinal direction of the tube; and multiple compressors, the control method comprising when the partitioned internal spaces are an upstream-side space on an entrance side of the first fluid and a downstream-side space on an exit side of the first fluid, calculating a terminal temperature difference in the downstream-side space from saturation temperature of the second fluid and a measured exit temperature value, the saturation temperature being estimated on the basis of a pressure value of the second fluid in the downstream-side space, the measured exit temperature value being a temperature of the first fluid measured at an exit of the heat exchanger, and estimating a temperature of the first fluid in the vicinity of an exit of the upstream-side space as a estimated temperature by subtracting the terminal temperature difference from a saturation temperature of the second fluid which is estimated on the basis of a pressure value of the second fluid in the upstream-side space, and correcting the estimated temperature according to loads on the upstream-side space and the downstream-side space.

4. A computer-readable recording medium in which a control program for a parallel-type chiller is stored, the parallel-type chiller including multiple shell-and-tube-type heat exchangers each of which includes a tube through which first fluid flows, a shell in which second fluid flows outside the tube and a partition plate partitioning an internal space in a direction crossing a longitudinal direction of the tube; and multiple compressors, the control program being for causing a computer to execute:

an estimation process for, when the partitioned internal spaces are an upstream-side space on an entrance side of the first fluid and a downstream-side space on an exit side of the first fluid, calculating a terminal temperature difference in the downstream-side space from a saturation temperature of the second fluid and a measured exit temperature value, the saturation temperature being estimated on the basis of a pressure value of the second fluid in the downstream-side space, the measured exit temperature value being a temperature of the first fluid measured at an exit of the heat exchanger, and estimating a temperature of the first fluid in the vicinity of an exit of the upstream-side space as a estimated temperature by subtracting the terminal temperature difference from a saturation temperature of the second fluid is estimated on the basis of a pressure value of the second fluid in the upstream-side space, and correcting the estimated temperature according to loads on the upstream-side space and the downstream-side space.

* * * * *